United States Patent
Coronato et al.

(10) Patent No.: US 10,088,315 B2
(45) Date of Patent: Oct. 2, 2018

(54) TWO FREQUENCY GYROSCOPE COMPENSATION SYSTEM AND METHOD

(71) Applicant: InvenSense, Inc., San Jose, CA (US)

(72) Inventors: Luca Coronato, Corsico (IT); Giacomo Gafforelli, Casatenovo (IT); Jaakko Ruohio, Milan (IT)

(73) Assignee: InvenSense, Inc., San Jose, CA (US)

( * ) Notice: Subject to any disclaimer, the term of this patent is extended or adjusted under 35 U.S.C. 154(b) by 179 days.

(21) Appl. No.: 15/225,272

(22) Filed: Aug. 1, 2016

(65) Prior Publication Data

US 2017/0167873 A1    Jun. 15, 2017

Related U.S. Application Data

(60) Provisional application No. 62/265,900, filed on Dec. 10, 2015.

(51) Int. Cl.
*G01C 19/5776* (2012.01)
*G01C 19/02* (2006.01)

(52) U.S. Cl.
CPC ......... *G01C 19/5776* (2013.01); *G01C 19/02* (2013.01)

(58) Field of Classification Search
CPC .... G01C 19/04; G01C 19/56; G01C 19/5719; G01C 19/5733; G01C 19/5776; G01C 19/5783; G01C 25/00; G01P 15/02; G01P 15/0802; G01P 2015/0862; G01P 2015/0868; G01P 21/00
USPC .......... 73/1.37, 1.38, 504.02, 504.12, 514.16
See application file for complete search history.

(56) References Cited

U.S. PATENT DOCUMENTS

| | | | |
|---|---|---|---|
| 7,086,270 B2 | 8/2006 | Weinberg et al. | |
| 7,980,135 B2 | 7/2011 | Prandi et al. | |
| 8,151,641 B2 | 4/2012 | Geen | |
| 8,459,093 B2 | 6/2013 | Donadel et al. | |
| 2002/0134154 A1 | 9/2002 | Hsu | |
| 2003/0070484 A1* | 4/2003 | Itakura | G01D 5/2417 73/514.32 |
| 2010/0145660 A1* | 6/2010 | Lang | G01D 3/08 702/193 |
| 2011/0041609 A1 | 2/2011 | Clark et al. | |
| 2011/0146402 A1 | 6/2011 | Donadel et al. | |
| 2013/0042664 A1 | 2/2013 | Wrede | |
| 2013/0106697 A1 | 5/2013 | Kulik | |
| 2013/0233048 A1 | 9/2013 | Mac | |
| 2017/0167876 A1 | 6/2017 | Coronato | |

FOREIGN PATENT DOCUMENTS

JP    2015203604    11/2015

* cited by examiner

*Primary Examiner* — Benjamin Schmitt
(74) *Attorney, Agent, or Firm* — Hanley Guiliano LLP; Alexander Shvarts; Joshua Van Hoven

(57) ABSTRACT

A gyroscope is driven at a drive frequency and senses a Coriolis force caused by rotation of the gyroscope. The response of the gyroscope to a given Coriolis force may change due to changes in the gyroscope over time. A plurality of test frequencies are applied to the gyroscope, and the response of the gyroscope to those test frequencies is analyzed in order to track changes in the response of the gyroscope. Operational parameters of the gyroscope may be altered in order to compensate for those changes.

28 Claims, 8 Drawing Sheets

TWO FREQUENCY GYROSCOPE COMPENSATION SYSTEM AND METHOD

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

Many sensors such as accelerometers, gyroscopes, pressure sensors, and microphones are implemented as microelectromechanical systems (MEMS) sensors. Micromechanical components of the sensor are fashioned using silicon fabrication techniques, and those micromechanical components respond (e.g., move) in response to certain external stimuli that are measured by the sensor, based on the design of the particular micromechanical components. The response of the micromechanical component to the external stimuli may be measured, e.g., by utilizing the moving micromechanical component as a "moving electrode" and measuring a voltage change caused by the motion of the moving electrode relative to a "fixed electrode." Based on the design of the sensor, this change in voltage is related to the parameter to be measured (e.g., acceleration, angular velocity, pressure, etc.) by a scaling factor.

In the case of a MEMS gyroscope, certain micromechanical components may have a drive mode resonant frequency and may be caused to vibrate at this frequency (i.e., a drive frequency). A number of components are often physically connected by a numerous springs, each of which is designed to enable motion in certain directions while restricting movement in other directions. When a mass that is vibrating at the drive frequency experiences a Coriolis force in a direction that is perpendicular to the drive direction as a result of rotation, it will move in this direction (e.g., a "sense" or "Coriolis" direction) at the drive frequency if springs or other structural features do not prevent such a motion. This motion may then be sensed based on the motion of the mass (or in some applications, an additional proof mass connected by additional springs) in the sense direction, e.g., based on the voltage change between a moving electrode on the mass and a fixed electrode. The rotation is measured based on the gain associated with the voltage change.

The mass or masses that make up a sense oscillator may have one or more sense mode resonant frequencies and a quality factor. The gain of the gyroscope may depend on the frequency at which movement is measured (e.g., relative to the sense mode resonant frequency) and the quality factor. If these parameters do not match the designed parameters (e.g., as a result of variances in manufacturing), the gain of the gyroscope may differ from an expected gain, which may result in measurement errors. As components wear over time, or if components are damaged, the gain of the gyroscope may change.

SUMMARY OF THE INVENTION

In an exemplary embodiment, a method for testing a frequency response of a sense oscillator of a gyroscope may comprise driving a drive oscillator of the gyroscope at a drive frequency, driving the sense oscillator at a first test frequency simultaneously with driving the drive oscillator, and driving the sense oscillator at a second test frequency simultaneously with driving the drive oscillator, wherein the first test frequency is distinct from the drive frequency and wherein the second test frequency is distinct from the drive frequency and the first test frequency. In an embodiment, the method may also comprise measuring a first test response of the sense oscillator at the first test frequency, measuring a second test response of the sense oscillator at the second test frequency, determining a change in the frequency response of the sense oscillator based on the first test response and the second test response, and modifying one or more operational parameters of the gyroscope based on the change in the frequency response.

In an exemplary embodiment, a gyroscope comprises a drive oscillator, one or more drive electrodes to drive the drive oscillator of at a drive frequency, and a sense oscillator, wherein the sense oscillator is driven at a first test frequency and a second test frequency, wherein the first test frequency is distinct from the drive frequency, wherein the second test frequency is distinct from the drive frequency and the first test frequency, and wherein the sense oscillator is driven at the first test frequency and second test frequency simultaneously with the driving of the drive oscillator at the drive frequency. In an embodiment, the gyroscope further comprises one or more sense electrodes to provide a first test response signal in response to an oscillation of the sense oscillator at the first test frequency and a second test response signal in response to an oscillation of the sense oscillator at the second test frequency. In an embodiment, the gyroscope further comprises processing circuitry configured to determine a change in the frequency response of the sense oscillator based on the first test response signal and the second test response signal, and to modify one or more operational parameters of the gyroscope based on the change in the frequency response.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A MEMS gyroscope may be designed to have a drive mode resonant frequency and a sense mode resonant frequency. One or more masses of the MEMS gyroscope are driven at the drive mode resonant frequency, and based on the design and placement of springs that interconnect different masses, one or more sense oscillators (e.g., a sense mass, proof mass, Coriolis mass, or any suitable combination thereof) of the MEMS gyroscope may move in a sense direction in response to a Coriolis force caused by rotation of the gyroscope. The angular velocity of the rotation of the gyroscope may be determined based on the movement of a moving electrode of the sense mass relative to a fixed electrode, which may be measured at the drive frequency.

In an embodiment, the sense oscillator is also vibrated at a plurality of test frequencies (e.g., two test frequencies), for example, by additional auxiliary electrodes attached to the sense oscillator. The test frequencies are different from the drive frequency and sense mode resonant frequency. The test frequencies are also different from each other. The frequency response of the sense oscillator due to the test frequencies may be measured at the test frequencies, by either the sense (moving and fixed) electrodes or by additional sensing electrodes.

The frequency response of the sense oscillator to the test frequencies may be compared to baseline values, thresholds, and/or previous values, in order to determine whether the frequency response of the sense oscillator has changed at either test frequency. If the frequency response has changed at the test frequency, this may indicate that the sense mode resonant frequency has changed, the gain has changed, or that both have changed. It may be possible to distinguish between different types of changes based on a comparison of the relative change in the frequency response that is experienced at each of the test frequencies. The results may further be compared to a variety of thresholds in order to determine whether the gyroscope has failed or whether it is possible to compensate for any changes in the frequency response of the gyroscope.

Figure 1:
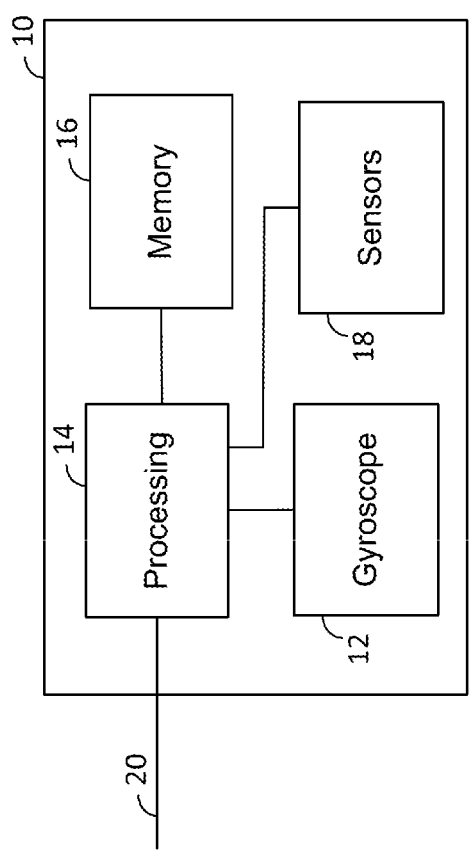
FIG. 1 depicts an illustrative motion processing system in accordance with some embodiments of the present disclosure.

FIG. 1 depicts an exemplary motion processing system 10 in accordance with some embodiments of the present disclosure. Although particular components are depicted in FIG. 1, it will be understood that any suitable combination of sensors, processing components, memory, and other circuitry may be utilized as necessary for different applications and systems. In an embodiment as described herein, the motion processing system may include at least a MEMS gyroscope 12 and supporting circuitry, such as processing circuitry 14 and memory 16. In some embodiments, one or more additional sensors 18 (e.g., additional MEMS gyroscopes, MEMS accelerometers, MEMS microphones, MEMS pressure sensors, and a compass) may be included within the motion processing system 10 to provide an integrated motion processing unit ("MPU") (e.g., including 3 axes of MEMS gyroscope sensing, 3 axes of MEMS accelerometer sensing, microphone, pressure sensor, and compass).

Processing circuitry 14 may include one or more components providing necessary processing based on the requirements of the motion processing system 10. In some embodiments, processing circuitry 14 may include hardware control logic may be integrated within a chip of a sensor (e.g., on a substrate or cap of a MEMS gyroscope, or on an adjacent portion of a chip to the gyroscope) such as the gyroscope 12 to control the operation of the gyroscope 12 and perform aspects of processing for the gyroscope 12. In some embodiments, the gyroscope 12 may include one or more registers that allow aspects of the operation of the hardware control logic (e.g., drive magnitude, test frequencies, gain factors applied to measured signals, etc.) to be modified (e.g., by modifying a value of a register). Other sensors 18 may operate in a similar manner. In some embodiments, processing circuitry 14 may include a processor such as a microprocessor that executes software instructions, e.g., that are stored in memory 16. The microprocessor may control the operation of the gyroscope 12 by interacting with the hardware control logic, and process measurement signals received from gyroscope 12. The microprocessor may interact with other sensors in a similar manner.

Although in some embodiments (not depicted in FIG. 1), the gyroscope 12 or other sensors 18 may communicate directly with external circuitry (e.g., via a serial bus or direct connection to sensor outputs and control inputs), in an embodiment the processing circuitry 14 may process data received from the gyroscope 12 and other sensors 18 and communicate with external components via a communication interface 20 (e.g., a SPI or I2C bus, or in automotive applications, a controller area network (CAN) or Local Interconnect Network (LIN) bus). The processing circuitry 14 may convert signals received from the gyroscope 12 and other sensors 18 into appropriate measurement units (e.g., based on settings provided by other computing units communicating over the communication bus 20) and perform more complex processing to determine measurements such as orientation or Euler angles, and in some embodiments, to determine from sensor data whether a particular activity (e.g., walking, running, braking, skidding, rolling, etc.) is taking place.

In some embodiments, certain types of information may be determined based on a data from multiple gyroscopes 12 and sensors 18, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

A MEMS gyroscope may typically have a plurality of micromechanical components that are used in order to measure rotation about an axis (e.g., pitch, roll, and/or yaw). One or more of the micromechanical components are caused to vibrate at a drive frequency, typically through an electrostatic drive system such as drive electrodes or drive combs. The components (e.g., a drive oscillator such as drive masses) are caused to vibrate at the drive frequency in a drive direction. This drive frequency corresponds to the drive mode resonant frequency of the drive oscillator. Although it may be possible to measure rotation from the drive oscillator, in many gyroscopes a sense oscillator (e.g., Coriolis masses, proof masses, sense masses, etc.) is coupled to the drive oscillator by springs, which often restrict the freedom of motion of the masses in certain directions based on the spring design and placement.

A mass (e.g., a Coriolis mass or a sense mass of a sense oscillator) that is vibrating in the drive direction may experience a force as a result of rotation of gyroscope about an axis. This Coriolis force is imparted on the mass in a direction (i.e., the sense direction) that is perpendicular to both the drive direction and the axis about which the gyroscope is rotating. When a mass (e.g., a sense mass of a sense oscillator) that experiences a Coriolis force is free to move in the sense direction (e.g., based on the configuration of the sense oscillator), this mass will oscillate in the sense direction at the drive frequency. The frequency response in the sense direction as a result of the Coriolis force may be based on a sensing transfer function. The sensing transfer function may be based on the design of the particular gyroscope, and may be associated with a sense mode resonant frequency and quality factor for the gyroscope design. Based on the sense mode resonant frequency and quality factor, a gain curve may depict the gain that is experienced by the gyroscope design at different frequencies. In some embodiments, the drive frequency and test frequencies may be selected to correspond to locations of the gain curve in which the gain is predictable yet high enough to be easily measured.

In some embodiments, the test frequencies and drive frequency may be selected such that they are within a similar gain range, such that an expected gain difference at between each of the test frequencies and the drive frequency for a certain sense mode resonant frequency is within an acceptable range for a particular application. In an embodiment, an expected gain at each of the test frequencies may be within 75% of the gain at the drive frequency (e.g., for a gain of 10 at the drive frequency, both test frequencies will have a gain of at least 2.5 or less than 17.5) for the test frequencies to provide useful measurements with respect to the gain at the drive frequency. However, in many embodiments the test frequencies may be selected to enable smaller gain differences such as 50%, 33%, 25%, 10%, or 5%. In some embodiments, other factors such as the likelihood of the driving of the sense oscillator at the test frequencies to interfere with each other or with the sensed response to the drive frequency may be considered. In addition to optimizing the gain, it may be desired to consider whether the test frequencies have at least a minimum difference in frequency from the sense mode resonant frequency, the drive frequency, and each other. In some embodiments, a range of test frequencies may provide desired relative gain characteristics without impacting the sense measurements at the drive frequency, as described herein.

In an embodiment, each of the test frequencies may be chosen such that they are located at a location on the gain curve that is near the sense mode resonant frequency but not close enough to approach the high gain portion of the gain curve associated with the sense mode resonant frequency. Although a drive mode resonant frequency and the sense mode resonant frequency may be configured in any suitable manner in accordance with the present disclosure (e.g., split-mode, mode-matched, etc.), in an embodiment as described herein the gyroscope may function as a split-mode gyroscope with a different sense mode resonant frequency and drive mode resonant frequency.

Although any suitable number of test frequencies may be utilized in accordance with the present disclosure, in an embodiment two test frequencies may allow for the identification of different error and failure modes, for example, as a result of a frequency shift, gain change, or both. However, it will be understood that in some embodiments one test frequency may be used to identify changes in the frequency response, and the function thereof could be optimized (e.g., changing the test frequency at different times, and comparing results) in a manner that may permit distinguishing between different error or failure modes. Moreover, additional test frequencies (e.g., three or more) may be utilized to determine additional information about any changes to a frequency response.

In an embodiment, as described herein, the test frequencies may be located on an opposite side from the sense mode resonant frequency from the drive frequency. In other words, if the drive frequency is greater than the sense mode resonant frequency, the test frequencies will be less than the sense mode resonant frequency, and vice-versa. However, it will be understood that in some embodiments one or more of the test frequencies may be located on the same side of the sense mode resonant frequency as the drive frequency. In other words, if the drive frequency is greater than the sense mode resonant frequency, one or more of the test frequencies may also be greater than the sense mode resonant frequency, and vice-versa. In any event, in some embodiments the test frequencies may be located at a sufficiently different frequency from the drive frequency and sense mode resonant frequency as is necessary to prevent interference with the sensing at the drive frequency. In an embodiment, locating the test frequencies on the opposite side of the sense mode resonant frequency from the drive frequency may limit undesirable interference.

In many MEMS gyroscopes, magnitude and angular velocity is measured based on the movement of the sense oscillator (e.g., a sense mass). This motion is measured based on the relative distance between the moving electrodes of the sense mass and fixed sense electrodes at the drive frequency. In some embodiments, the sense electrode may be attached to a parallel substrate below the sense mass (e.g., as a sense plate) or anchored to the substrate and located in the plane of the sense mass (e.g., as a sense plate or sense combs). The sense mass and the opposing sense electrode effectively form a capacitor, the voltage of which varies based on the distance between the sense mass and the sense electrode. The magnitude of the voltage change varies based on the magnitude of the Coriolis force, and is used (e.g., by processing of the processing circuitry 14) to determine magnitude and angular velocity.

The actual frequency response of a gyroscope may not always match a designed frequency response for the gyroscope. Imperfections in the manufacturing process may result in changes in the frequency response (e.g., sense mode resonant frequency, quality factor, and/or gain curve) of the gyroscope. In some cases, the gyroscope may experience a degree of wear over time during operation, or one or more components (e.g., a spring) may be damaged. This wear or damage may similarly change the sense mode resonant frequency response for the gyroscope.

The frequency response of a gyroscope may differ from the designed frequency response in a variety of manners. In some cases, the sense mode resonant frequency for the frequency response may shift, such that the center frequency for the frequency response is different. In other cases, the sense mode resonant frequency may stay the same, but the gain associated with the frequency response may change. In yet other cases, the quality factor of the frequency response may change, such that the shape (e.g., slope) of the gain curve is modified. In yet other cases, a plurality of these changes to the frequency response may occur at the same time. Any of these changes or combinations thereof may alter the accuracy of the measured magnitude and angular velocity.

As described herein, in an embodiment the sense oscillator (e.g., sense masses) of the gyroscope may be driven at one or more test frequencies that differ from both the drive and the sense mode resonant frequencies. The response of the sense oscillator at these test frequencies may be measured, and based on those measurements, processing circuitry (e.g., processing circuitry 14) may determine whether the frequency response is improper or has changed. In some embodiments, this determination may be performed based on the measurement and comparison of the magnitude of the response at the test frequencies. If a problem with the sense mode resonant frequency is identified, it may further be determined whether it is possible to compensate for the modified sense mode resonant frequency response, or whether the gyroscope should be identified as failed. In some embodiments, operational factors such as the magnitude of drive force, compensatory sense forces (e.g., from sense electrodes), scaling factors (e.g., for measured values from sense electrodes), amplifier gains (e.g., based on inputs to hardware control logic, and that are applied to the outputs of sense electrodes), sense electrode gaps, any other suitable factors, or any combination thereof, may be modified in order to compensate for the operation of the gyroscope based on the measurements at the test frequencies.

Figure 2:
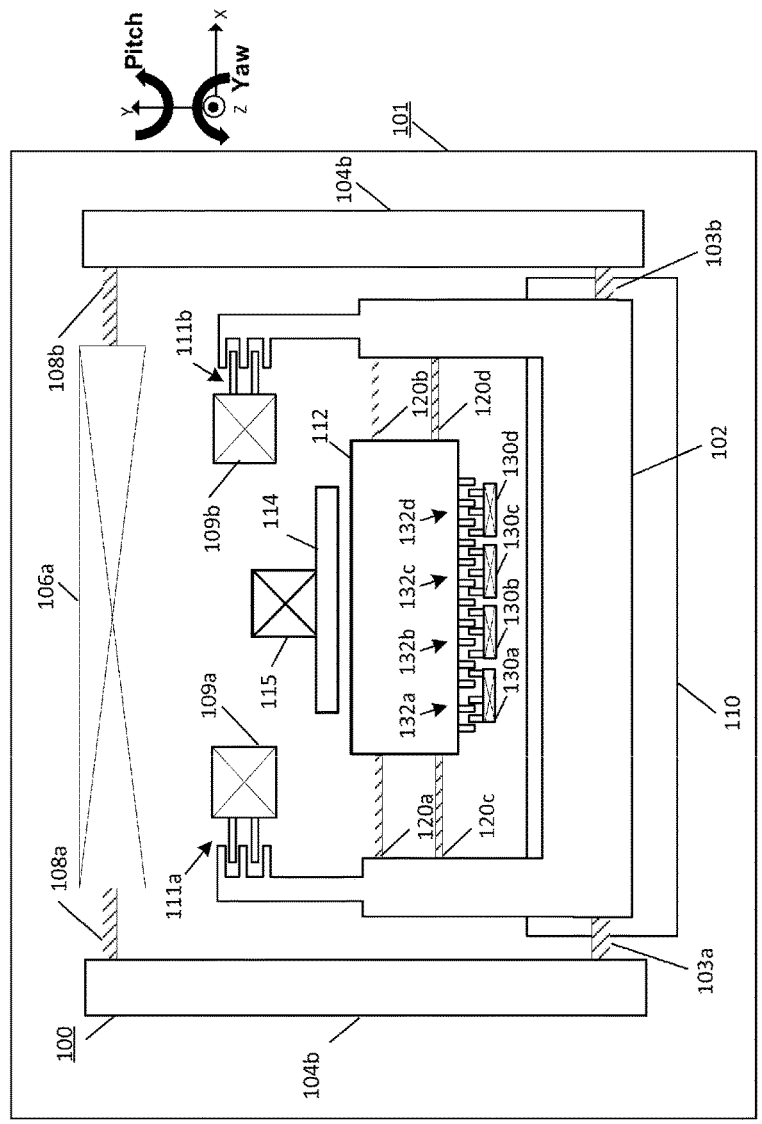
FIG. 2 depicts an exemplary gyroscope design in accordance with some embodiments of the present disclosure.

FIG. 2 depicts an exemplary gyroscope design that may be utilized in accordance with the present disclosure. Although a particular gyroscope design is depicted and described herein for purposes of illustration, it will be understood that the systems and methods described in the present disclosure may be utilized with a variety of gyroscope designs, e.g., as long as it is possible to drive the sense oscillator of the gyroscope at one or more test frequencies, and measure the sense response at those test frequencies. Thus, it will be understood that the discussion provided herein is general to gyroscope designs, and a particular design is provided solely for illustrative purposes.

An exemplary gyroscope 100 is disposed in an X-Y plane parallel to a substrate 101. A Z-direction is normal to the X-Y plane, and the substrate 101 is located below the gyroscope 100 in the z-direction. The gyroscope 100 includes guiding arms 104a and 104b that are flexibly coupled via springs 108a and 108b to the substrate 101 via at least one anchoring point 106a. The two guiding arms 104a and 104b are flexibly coupled to pitch sense mass 102 via springs 103a and 103b. In an embodiment, the pitch sense mass 102 may function as both a drive oscillator and a sense oscillator. The pitch sense mass 102 in turn is coupled to another sense oscillator such as yaw sense mass 112 via springs 120a, 120b, 120c, and 120d.

The pitch sense mass 102, guiding arms 104a and 104b, anchoring point 106a, and springs 103a, 103b, 108a, and 108b form a planar four-bar linkage. Each spring 103a, 103b, 108a, and 108b is compliant in-plane about an axis in the Z-direction so that each guiding arm 104a and 104b can rotate in-plane while the sense mass 102 translates in an X-direction, e.g., in response to a Coriolis force in the Z-direction caused by a pitch rotation about the Y-axis.

The springs 108a and 108b are compliant about the pitch-sense axis in the X-direction so that the guiding arms 104a and 104b can rotate out-of-plane. The springs 103a and 103b are stiff in the Z-direction, whereby out-of-plane rotation of the guiding arms 104a and 104b causes the pitch sense mass 102 to move out-of-plane with the guiding arms 104a and 104b.

Electrostatic actuators, such as comb drives 111a and 111b, are connected to anchors 109a and 109b, and to the pitch sense mass 102. The comb drives 111a and 111b collectively drive the pitch sense mass 102 along the X-axis in the X-direction. In this embodiment, two electrostatic actuators are utilized. However, one of ordinary skill in the art readily recognizes that one electrostatic actuator can be provided and the use of one electrostatic actuator would be within the spirit and scope of the present invention, and that additional electrostatic actuators may be located in a variety of locations attached to the pitch sense mass 102. Moreover, although not depicted in the exemplary embodiment of FIG. 2, in an embodiment, one or more drive masses could be coupled to the pitch-sense mass 102, such that the drive mass is driven by the comb drives 111a and 111b, and the drive motion is imparted upon the pitch sense mass 102 by additional springs (not depicted in FIG. 2) that are coupled between the drive mass and pitch sense mass 102 and that are rigid in the X-direction.

In addition, although electrostatic actuators will be described throughout this specification as the actuators being used to drive the guided mass systems, one of ordinary skill in the art recognizes that a variety of actuators could be utilized for this function and that use would be within the spirit and scope of the present invention. For example, the actuators could be piezoelectric, thermal or electromagnetic or the like.

In an embodiment, the pitch sense mass 100 can be driven at the drive mode resonant frequency of the drive oscillator by one or more drive circuits coupled to the actuators 109a and 109b. In an embodiment as described herein, the drive frequency may be a frequency that is located at a suitable frequency difference relative to the sense mode resonant frequency of the gyroscope 100, while maintaining a sufficient gain. In exemplary embodiments, the frequency difference may be at least 3% of the sense mode resonant frequency, and in some embodiments in a range of 7-15% of the sense mode resonant frequency. It will be understood that other minimum differences or ranges of differences may apply to different gyroscope designs an applications. In an embodiment, the selection of the difference between the drive frequency and the sense mode resonant frequency may be based on a desired range of gain and resolution, wherein the gain at the drive frequency increases when the drive frequency is closer to the sense mode resonant frequency and the resolution increases when the drive frequency is farther from the sense mode resonant frequency.

When the gyroscope 100 is driven, the guiding arms 104a and 104b rotate in-plane and the pitch sense mass 102 translates in-plane in the X-direction. Angular velocity about a pitch-input axis in the Y-direction that is in the plane of the substrate and orthogonal to the X-direction will cause a Coriolis force to act on the pitch sense mass 102 in the Z-direction. The Coriolis force causes the gyroscope pitch sense mass 102 and the guiding arms 104a and 104b to rotate out-of-plane about the pitch-sense axis. The amplitude of the rotation of the gyroscope 100 is proportional to the angular velocity about the pitch-input axis. A pitch transducer 110 may sense the movement of the sense mass, and may be any suitable pitch transducer 110 such as a capacitive, piezoelectric, or optical transducer, or the like. In an embodiment, a sense electrode 110 under the pitch sense mass 102 is used to detect the rotation of the gyroscope 100 about the pitch-sense axis, based on the change in capacitance due to the changes in the distance between the pitch sense mass 102 (e.g., including a moving electrode or functioning as the moving electrode) and the sense electrode 110. This change in capacitance provides a measure of the angular velocity about the pitch-input axis.

Gyroscope 100 also includes a yaw sense oscillator such as yaw sense mass 112, which responds to a rotation about the Z-axis. In an embodiment, the yaw sense mass 112 may be coupled to the pitch sense mass 102 by springs 120a, 120b, 120c, and 120d. Although four springs 120a-120d are depicted in FIG. 2, it will be understood that any suitable number of springs may transfer the drive force to the yaw sense mass 112 in accordance with the present disclosure. In an embodiment, the springs 120a-120d may be configured to be rigid in the drive direction (i.e., the X-direction) and flexible in the sense direction (i.e., the Y-direction). Moreover, it will be understood that in some embodiments (not depicted in FIG. 2) the yaw oscillator may be implemented as a plurality of masses, such as a Coriolis mass coupled to receive the drive force from the pitch sense mass 102 and an additional proof mass connected to the Coriolis mass by additional springs that are rigid in the direction of a Coriolis force (e.g., in the Y-direction) imparted on the Coriolis mass due to a yaw rotation.

As described herein, the drive combs 111a and 111b cause the pitch sense mass 102 to vibrate in the X-direction. This X-direction vibration is transferred to the yaw sense mass 112 by the springs 120a-120d, which are rigid in the X-direction. When the gyroscope 100 is rotated about the Z-axis, this will result in a Y-axis Coriolis force on the yaw sense mass 112 that causes a Y-axis oscillation at the drive frequency. Because the springs 120a-120d are flexible in the Y-direction, the yaw sense mass 112 will oscillate in the Y-direction with a magnitude that is proportional to the Coriolis force and thus the angular velocity. A yaw transducer 114 may sense the movement of the sense mass, and may be any suitable yaw transducer 110 such as a capacitive, piezoelectric, or optical transducer, or the like. In an embodiment, a sense electrode 114 may be a plate electrode (although in some embodiments, different electrodes such as comb electrodes may be utilized for the sense electrode 114) located in plane with the yaw sense mass 112 (e.g., anchored to the substrate and electrically connected to sense circuitry via anchor 115) to detect the rotation of the gyroscope 100 about the yaw-sense axis, based on the change in capacitance due to the changes in the distance between the yaw sense mass 112 (e.g., including a moving electrode or functioning as the moving electrode) and the sense electrode 114. In some embodiments (not depicted in FIG. 2), the sense electrode 114 may be located within an interior cavity of yaw sense mass 112. However the sense electrode 114 is implemented and arranged, the change in capacitance due to relative movement between sense electrode 114 and yaw sense mass 112 provides a measure of the angular velocity about the yaw-input axis.

In an embodiment, the yaw sense mass 112 may be configured to be driven by one or more test signals. Although not depicted for the pitch sense mass 102 in the exemplary embodiment of FIG. 2, it will be understood that test signals could similarly be imparted on pitch sense mass 102 (e.g., based on auxiliary electrodes located above or below pitch sense mass 102). The one or more test signals may be imparted on the yaw sense mass 112, in order to cause the yaw sense mass 112 to vibrate at one or more test frequencies. Although any suitable number of test signals may be imparted upon the yaw sense mass 112 at any suitable frequencies, in an embodiment two test signals may be imparted upon the sense mass at frequencies that are on the other side of the sense mode resonant frequency from the drive frequency. Although the test frequencies may be located at any suitable frequency relative to the sense mode resonant frequency, in an embodiment both of the test frequencies may be at least 2 percent greater or less than the sense mode resonant frequency, and in some embodiments, at least 4 percent greater or less than the sense mode resonant frequency. Although the test frequencies may be located at any suitable frequencies relative to each other, in an embodiment a frequency difference between the test frequencies may be between 1 to 10 percent of the sense mode resonant frequency, and in some embodiments, between 2 to 6 percent of the sense mode resonant frequency. As described herein, the appropriate frequencies of the test mode frequencies may be selected based on factors such as appropriate gains relative to the gain at the drive frequency and non-interference with the response of the sense mass at the drive frequency, and thus, may have a variety of values based on a particular gyroscope design and its expected frequency response.

In some embodiments (not depicted in FIG. 2), the test signals may be imparted upon the yaw sense mass 112 by the sense electrode 114. The sense electrode 114 may be functionally multiplexed such that it actively switches between providing test signals, measuring test responses, and measuring Coriolis forces. In additional to sense circuitry designed to receive and process the Coriolis forces and test responses, the sense electrode may also include drive circuitry to provide voltage necessary to impart the test signal on the yaw sense mass 112. In an embodiment, auxiliary actuators 132a-132d may impart the test signals on the yaw sense mass 112. Although auxiliary actuators 132a-132d may utilize any suitable method (e.g., piezoelectric, thermal, electromagnetic, etc.) of imparting the test signals on the yaw sense mass 112, in an embodiment the auxiliary actuators 132a-132d may be electrostatic comb actuators located in plane and on the periphery of the yaw sense mass 112. In other embodiments, the auxiliary actuators 132a-132d may be located at other suitable locations, such as within an interior cavity of the yaw sense mass 112.

In an embodiment, the comb auxiliary actuators 132a-132d may be anchored to the substrate, and connected to drive and/or sense circuitry, via respective anchors 130a-130d. Although four actuators are depicted to provide two test signals in FIG. 2, in different embodiments any suitable number of actuators may be utilized to provide any suitable number of test signals. For example, a lesser number of actuators may be provided than the number of test signals, and the test signals may be provided in a multiplexed manner. In some embodiments, rather than sensing the test response at the sense electrode 114, one or more of the comb electrodes 132a-132d may function as sense combs for the test responses, in either a dedicated or multiplexed manner (e.g., multiplexed with the actuation of the test signals and/or the measurement of other test responses).

The forces that are applied to the yaw sense mass 112 by the comb auxiliary actuators 132a-132d are applied and sensed along the Y-axis, which is permitted due to the flexibility of the springs 120a-120d in the Y-axis. As described herein, one or more components of the gyroscope—such as drive electrodes 111a or 111b or any of springs 103a, 103b, 108a, 108b, 120a, 120b, 120c, or 120d—may wear or become damaged over time, possibly causing changes to the expected frequency response of the yaw sense mass 112. As described herein, the auxiliary actuators 132a-132d (or in some embodiments, sense electrode 114) may provide test signals to drive the yaw sense mass 112 at test frequencies, and a test response may be measured for each test frequency by sense electrode 114 or auxiliary actuators 132a-132d. The test responses may be processed by circuitry of the gyroscope 100, and in some embodiments, processing circuitry 12. Based on analysis of the test responses, it may be determined whether the gyroscope 100 has failed or whether it is possible to compensate for any changes in gyroscope behavior. If compensation is possible, one or more operational parameters of the gyroscope 100 may be modified, such as the magnitude of the drive signal provided by the comb electrodes 111a and 111b, the operation of analog sensing circuitry (e.g., one or more amplifiers of the sense circuit of gyroscope 114), or one or more digital scaling factors (e.g., at gyroscope 100 or processing circuitry 14).

In some embodiments, a gyroscope such as gyroscope 100 may be tested at various times (e.g., during manufacturing) in order to set parameters for operation of the gyroscope. Operational parameters for the test signals (e.g., frequency, magnitude, etc.) may be modified as a result of such testing. In an embodiment of manufacturing testing, the frequency and magnitude may be modified based on factors such as a measured sense mode resonant frequency or gain, and based on the configuration of other parameters (e.g., magnitude of the drive signal.).

Figure 3:
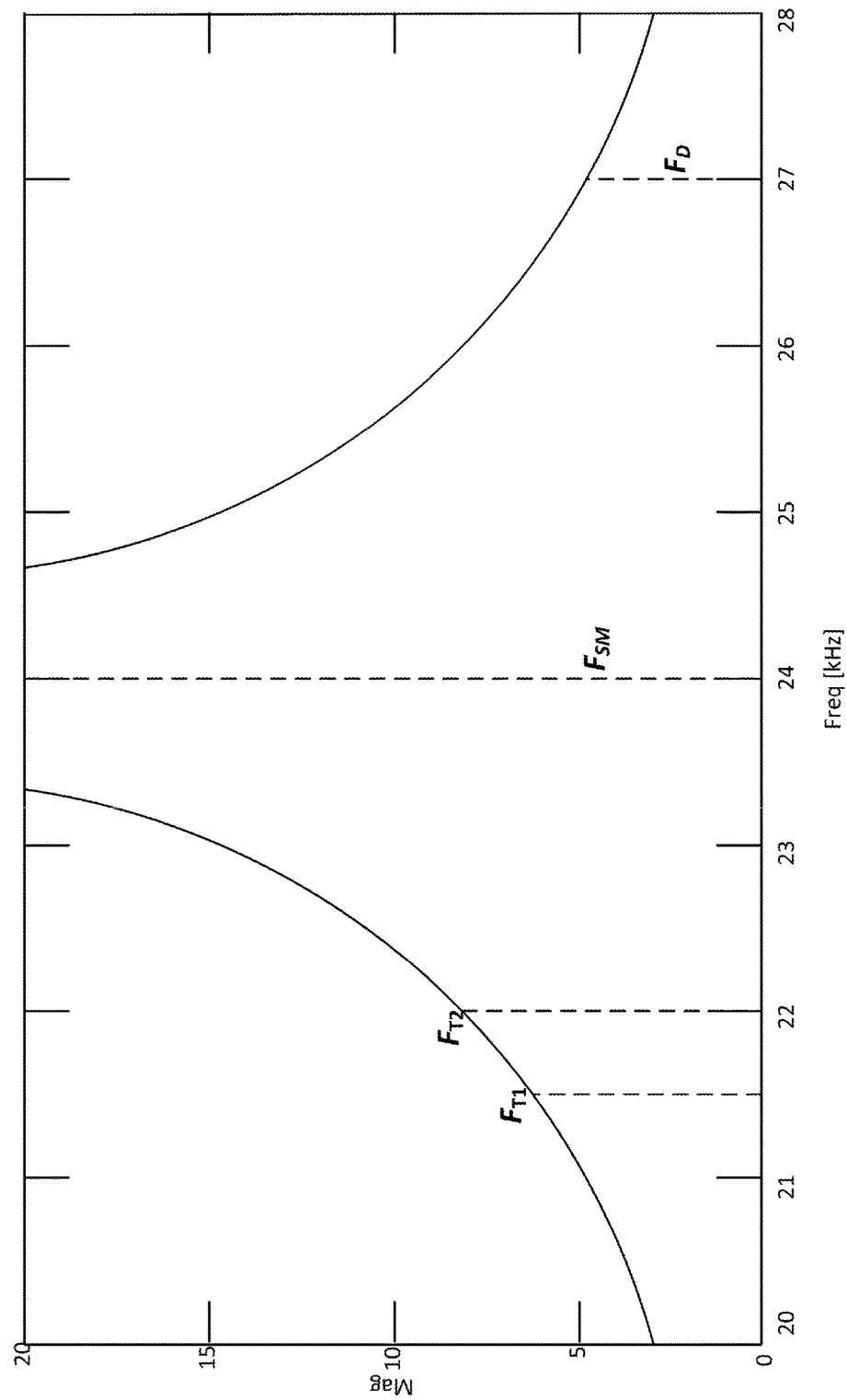
FIG. 3 depicts an exemplary frequency response for a sense oscillator of a gyroscope having a certain sense mode resonant frequency in accordance with some embodiments of the present disclosure.
Figure 4:
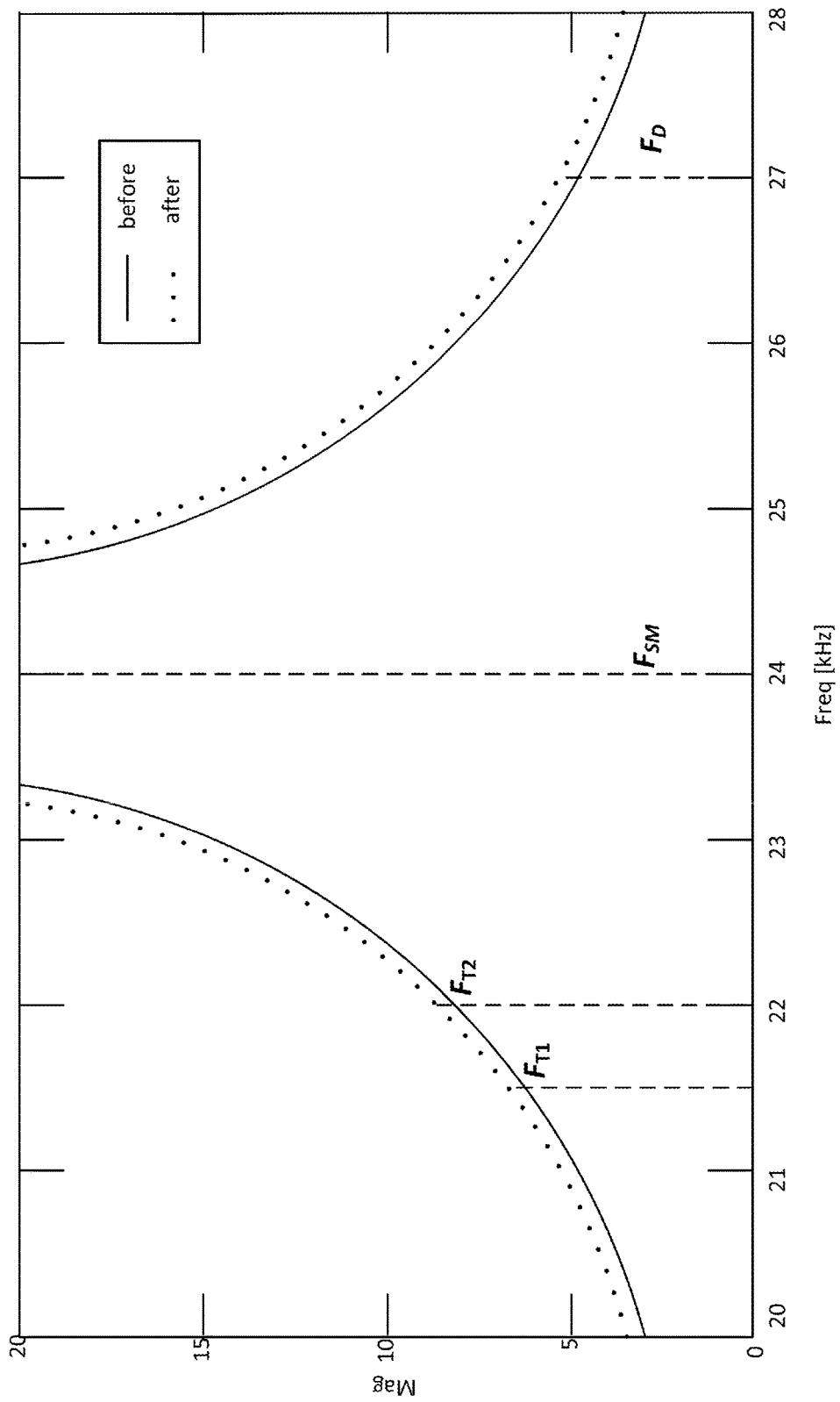
FIG. 4 depicts an exemplary gain change for the sense oscillator of FIG. 3 in accordance with some embodiments of the present disclosure.
Figure 5:
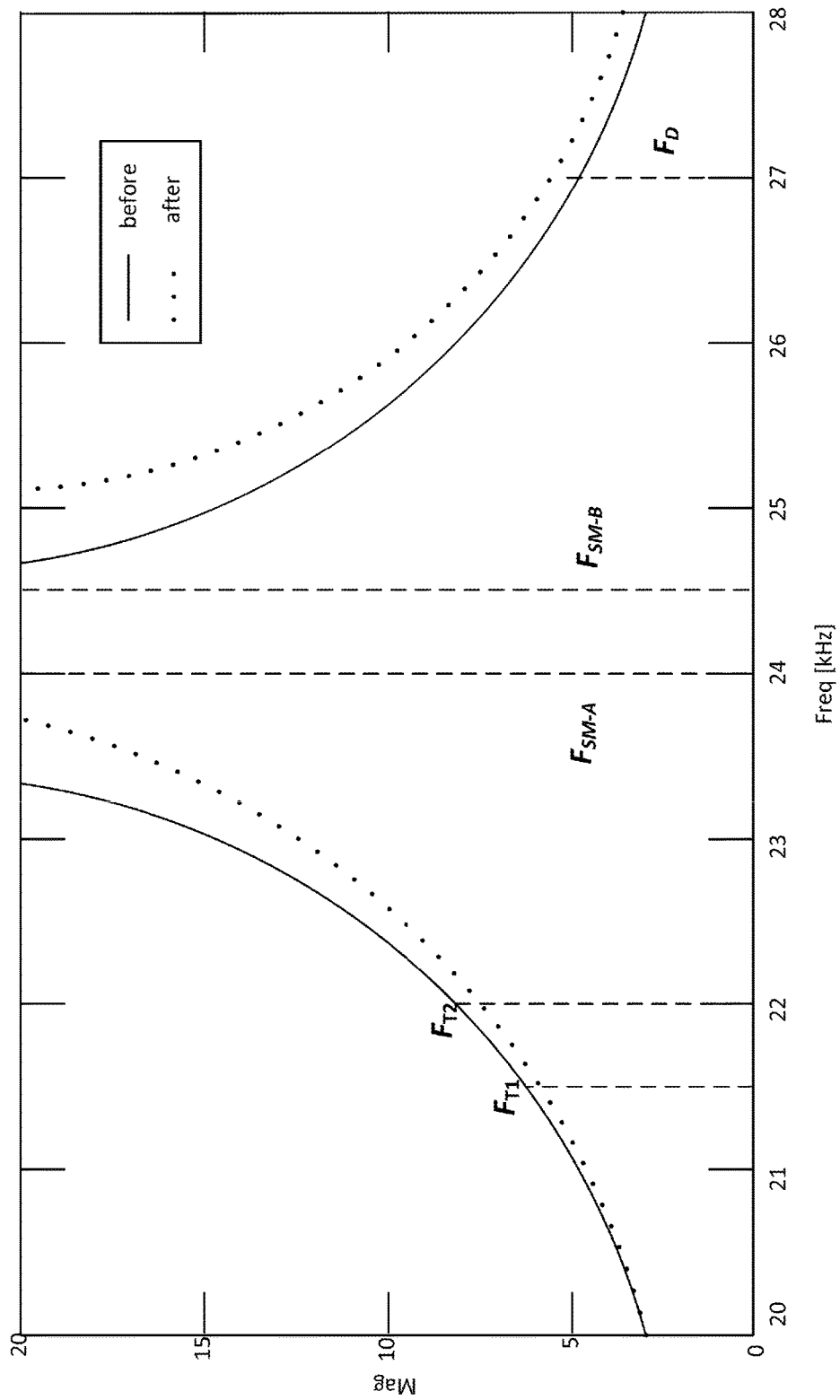
FIG. 5 depicts an exemplary frequency shift for the sense oscillator of FIG. 3 in accordance with some embodiments of the present disclosure.

FIGS. 3-5 depict exemplary frequency responses for an exemplary sense oscillator of a gyroscope in accordance with some embodiments of the present disclosure. Although the frequency responses are depicted for an exemplary gyroscope having a designed sense mode resonant frequency of 24 kHz and a quality factor of 600, it will be understood that other gyroscope designs will have different sense mode resonant frequencies and frequency responses, but may respond in a similar manner (e.g., changes in sense mode resonant frequency and gain) as a result of failure or changes in gyroscope operation.

FIG. 3 depicts an exemplary frequency response for an exemplary sense oscillator of a gyroscope in accordance with some embodiments of the present disclosure. In the exemplary sense oscillator having the characteristics depicted in FIG. 3, an exemplary sense mode resonant frequency is 24 kHz and an exemplary quality factor is 600, however it will be understood that the present disclosure may be applied to other gyroscope designs having different sense mode resonant frequencies, quality factors, and gains in accordance with the present disclosure. The abscissa of the graph depicted in FIG. 3 is in units of kilohertz while the ordinate is a normalized gain value.

As depicted in FIG. 3, a sense mode resonant frequency $F_{SM}$ for the gyroscope design may be 24 kHz. At or near this sense mode resonant frequency (e.g., for the particular sense oscillator of FIG. 3, within a range of plus or minus 1 kHz-1.5 kHz), the gain may be relatively unstable, or difficult to scale, based on the high slope of the frequency response on this frequency range. It will be understood that other ranges may apply to other gyroscope designs. Accordingly, it may be desirable to have drive and test frequencies located at different locations on the frequency response. Although the drive frequency $F_D$ may be located at any suitable frequency as described herein, in an embodiment, the drive frequency may be 27 kHz, e.g., at 3 kHz greater than the sense mode resonant frequency, or 12.5% greater than the sense mode resonant frequency. In an embodiment, the drive frequency $F_D$ may correspond to the drive mode resonant frequency for the gyroscope. The drive frequency may be utilized for driving the gyroscope and sensing the Coriolis force, and operational parameters for the drive frequency such as drive force magnitude, scaling factors (e.g., digital scaling), and gain values (e.g., for amplifiers) may be based on the assumption that the gain of the gyroscope at the drive frequency is as depicted in FIG. 3 (e.g., approximately 5 on the normalized scale depicted in FIG. 3).

As described herein, one or more (e.g., two) test signals may also be applied to the gyroscope (e.g., to a sense oscillator of the gyroscope) and the response of the sense oscillator to the test signals may be measured. Although the test frequencies $F_{T1,T2}$ may be located at any suitable frequency relative to the sense mode resonant frequency $F_{SM}$ as described herein, in an embodiment, the closest test frequency $F_{T1}$ may be at 22 kHz, e.g., at 2 kHz less than the sense mode resonant frequency $F_{SM}$, or 8.2% less than the sense mode resonant frequency $F_{SM}$. In this manner, the test frequencies $F_{T1,T2}$ may be located at a suitable location on the frequency response curve to consistently measure a gain, and on the opposite side of the sense mode resonant frequency from the drive frequency so as to avoid interfering with the drive frequency.

In an embodiment, the two test signals may be applied to the sense oscillator (e.g., the sense mass of the gyroscope) at two different frequencies. Although the frequencies of the test signals may be chosen in any suitable manner as described herein, in an embodiment the test signal frequencies $F_{T1}$ and $F_{T2}$ may be located at a suitable frequency separation relative to each other such that under normal conditions they are at a substantially different location on the gain curve, while remaining within a desired range of the gain at the drive frequency. As depicted in FIG. 3, in an exemplary embodiment, a first test signal frequency $F_{T1}$ may be 21.5 kHz and may be associated with a normalized gain of approximately 6, while a second test signal frequency $F_{T2}$ may be 22 kHz and may be associated with a normalized gain of approximately 8. In the exemplary embodiment of FIG. 3, this may result in a gain difference of 1 between the first test frequency $F_{T1}$ and the drive frequency $F_D$ and a gain difference of 3 between the second test frequency $F_{T2}$ and the drive frequency $F_D$. However, it will be understood that the test frequency values provided in FIG. 3 are exemplary only, and other test frequencies may be chosen to optimize the gain relative to the drive frequency in any suitable manner as described herein.

As described for FIGS. 4 and 5, different changes in the frequency response of the gyroscope may result in different relative changes in the gain at the two test frequencies. In an embodiment, a baseline magnitude for the measured response of the sense mass (e.g., the change in voltage sensed by one or more sense electrodes) to the test signals at each of the test frequencies $F_{T1}$ and $F_{T2}$ may be determined, this measured magnitude being proportional to normalized gain depicted in FIG. 3.

FIG. 4 depicts an exemplary gain change in accordance with some embodiments of the present disclosure. The ordinate and abscissa of FIG. 4 are in the same units (frequency in kilohertz and normalized gain), and the drive frequency $F_D$, sense mode resonant frequency $F_{SM}$, first test frequency $F_{T1}$, and second test frequency $F_{T2}$ are all located at the same frequency as described in FIG. 3. The solid line in FIG. 4 depicts the original frequency response of the gyroscope as depicted in FIG. 3. The dotted line in FIG. 4 depicts a changed frequency response, e.g., due to wear of one or more components of the gyroscope over time.

As can be seen in FIG. 4, the gain at the drive frequency may be changed (e.g., increased) as a result of the change of the frequency response of the gyroscope. In some embodiments, such a gain change may be so large that it may cause failures in measuring angular velocity. For example, a large increase in gain may cause saturation of the sense circuitry, such that certain desired ranges of angular velocity cannot be sensed. Similarly, a large decrease in the gain may result in inadequate resolution for the sense circuitry, such that desired changes in angular velocity cannot be sensed accurately. In some embodiments, even if a change in gain does not result in the gyroscope being unable to measure angular velocity, that gain change may modify the values that are received for the angular velocity, e.g., based on expected correlations between the sensed change in voltage (proportional to gain) and angular velocity values. Increases or decreases in gain may result in improper comparison to thresholds that no longer accurately correspond to the gain of the frequency response of the gyroscope.

Because the sensed voltage at the drive frequency varies based on an external force (e.g., angular velocity due to rotation of the gyroscope, which causes the Coriolis force in the sense direction at the drive frequency), it may not be possible to determine whether a change in gain has occurred based on measurements at the drive frequency. Absent a large and severe change in the sensed voltage at the drive frequency (e.g., due to catastrophic failure of the gyroscope), it is unlikely that the gain will change in a manner that may be distinguished from normal variation in rotation of the gyroscope under normal operating conditions.

The test signals may be applied to the gyroscope (e.g., the sense oscillator of the gyroscope) in a number of manners in order to identify changes in the frequency response of the gyroscope. In an embodiment, each test signal may have a fixed magnitude, such that a change in the magnitude of the gain may be known to be due to a change in the frequency response of the gyroscope. In some embodiments, each test frequency may be provided at multiple fixed magnitudes that may be compared over time. In any event, by providing test signals at fixed magnitudes, changes in the frequency response may be accurately determined based on changes in the gain (e.g., based on the measured voltage changes at the sense electrode(s) at the test frequencies).

In the embodiment of FIG. 4, a similar gain change may be sensed at each of the test frequencies. This may indicate that the gain has changed, but that the sense mode resonant frequency of the gyroscope has not changed. This gain change may be compared to one or more thresholds to determine whether it is necessary to compensate for the change in frequency response as described herein, or whether the gyroscope has failed and should no longer be used.

FIG. 5 depicts an exemplary sense mode resonant frequency change in accordance with some embodiments of the present disclosure. The ordinate and abscissa of FIG. 5 are in the same units (frequency in kilohertz and normalized gain), and the drive frequency $F_D$, first test frequency $F_{T1}$, and second test frequency $F_{T2}$ are all located at the same frequencies as described in FIG. 3. In FIG. 5, the sense mode resonant frequency has changed from approximately 24 kHz ($F_{SM-A}$) to 24.5 kHz ($F_{SM-B}$). The solid line in FIG. 5 depicts the original frequency response of the gyroscope as depicted in FIG. 3. The dotted line in FIG. 5 depicts a changed frequency response, e.g., due to wear of one or more components of the gyroscope over time.

As can be seen in FIG. 5, the gain at the drive frequency may be changed (e.g., increased) as a result of the change of the frequency response of the gyroscope. As described with respect to FIG. 4, such a gain change may be so large that it may cause failures in measuring angular velocity, may modify the values that are received for the angular velocity, and may result on effective changes in threshold values. Moreover, it may not be possible to determine whether a change in the frequency response has occurred based on measurements at the drive frequency. Nor may it be possible to distinguish between changes in gain (e.g., as depicted in FIG. 4) and changes in sense mode resonant frequency (e.g., as depicted in FIG. 5). For example, the change in frequency response at the measured drive frequency $F_D$ is approximately the same in both FIG. 4 and FIG. 5.

As in FIG. 4, the test signals may be applied to the gyroscope in order to identify changes in the frequency response of the gyroscope. In the embodiment of FIG. 5, a different gain change may be sensed at each of the test frequencies. For example, the gain change at the first test frequency $F_{T1}$ may be less than the gain change at the second test frequency $F_{T2}$. Because the gain change sensed at the two test frequencies is not approximately proportional (e.g., one gain change exceeds the other gain change by more than a threshold), this may indicate that the sense mode resonant frequency of the gyroscope has changed. Moreover, the sign of the gain changes (positive or negative) and the relative difference between the gain changes at the two test frequencies may be used to determine approximately how far the sense mode resonant frequency has shifted. This estimated frequency shift may be compared to one or more thresholds to determine whether it is necessary to compensate for the change in frequency response as described herein, or whether the gyroscope has failed and should no longer be used.

Figure 6:
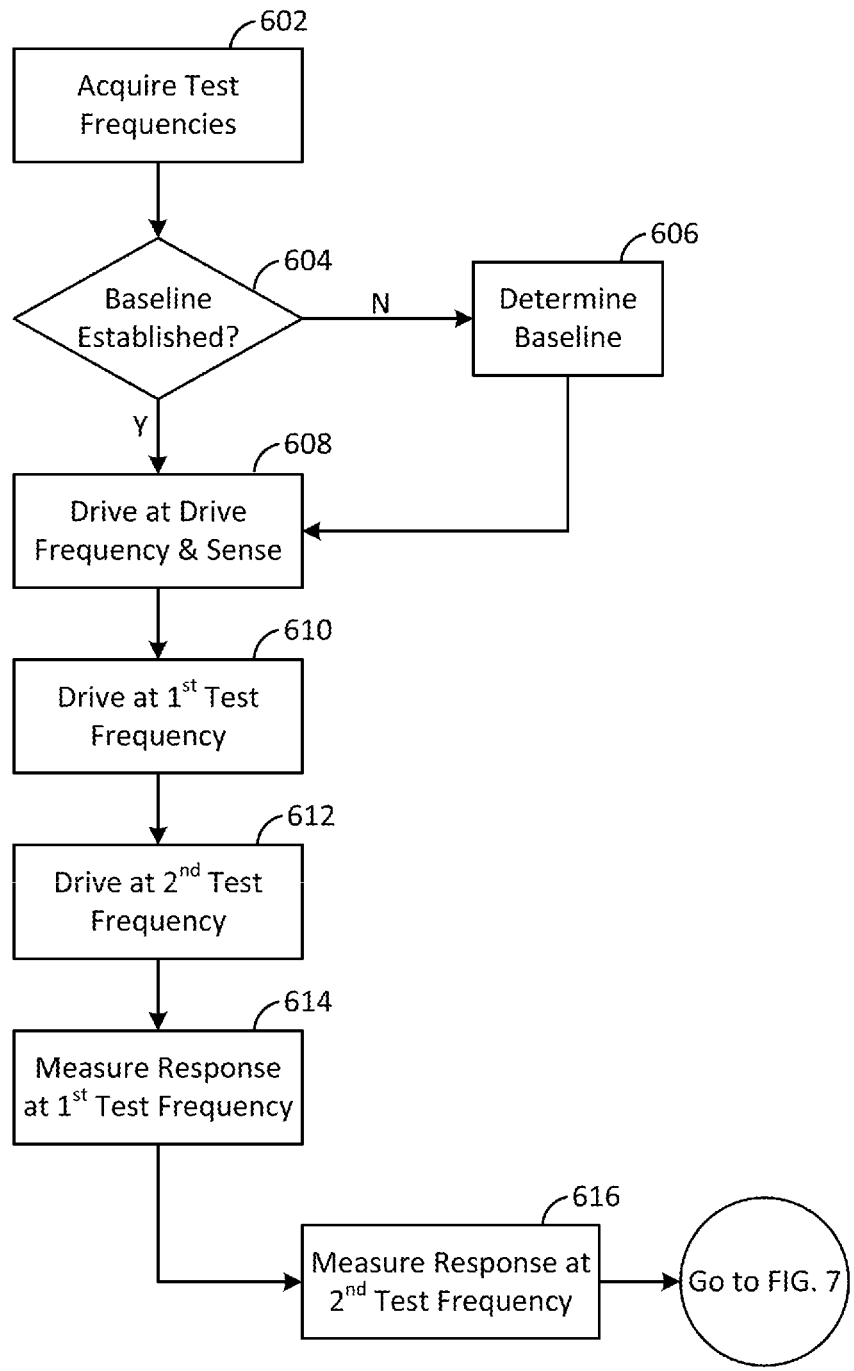
FIG. 6 depicts exemplary steps for frequency response testing in accordance with some embodiments of the present disclosure.
Figure 7:
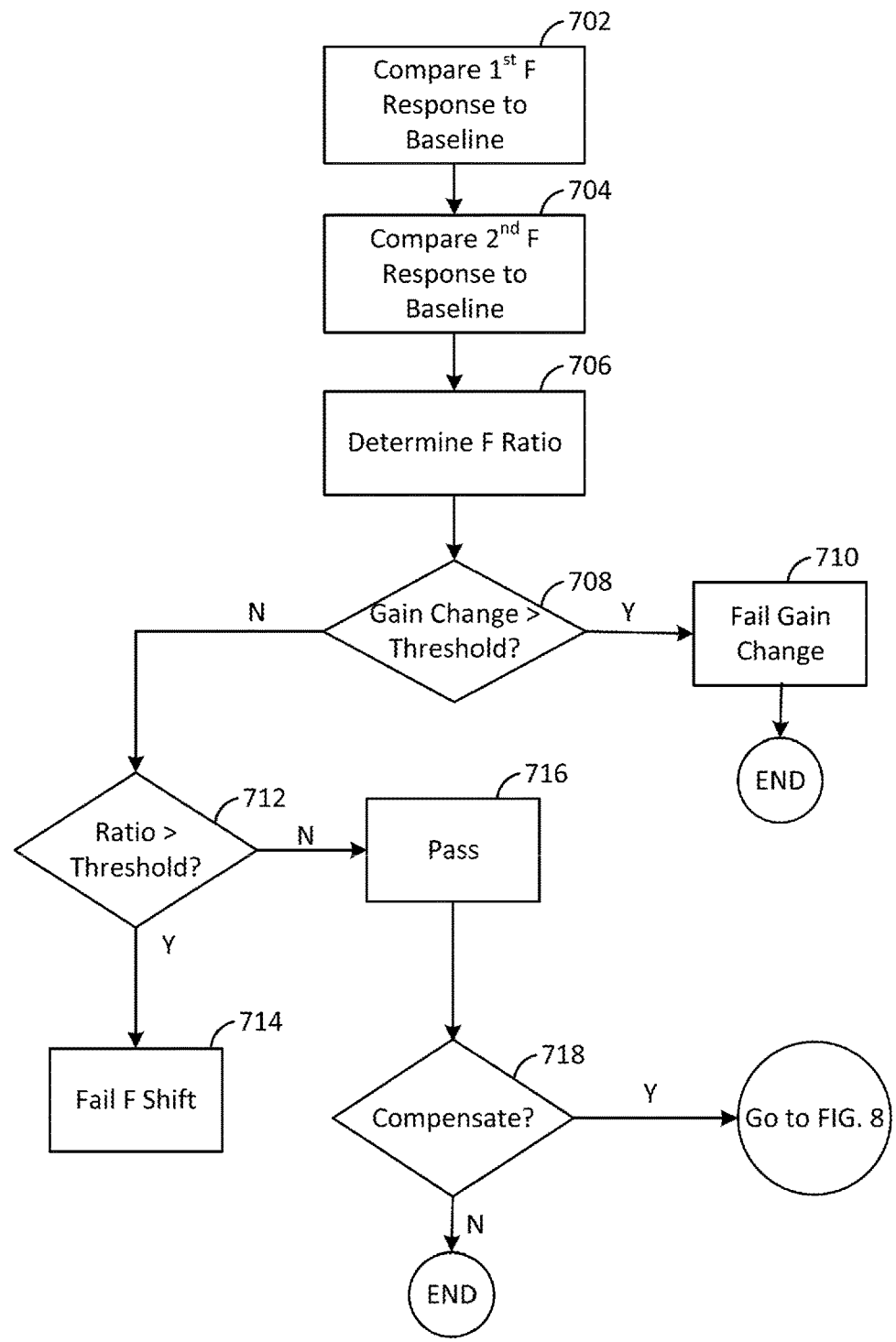
FIG. 7 depicts exemplary steps for frequency response self-testing in accordance with some embodiments of the present disclosure.
Figure 8:
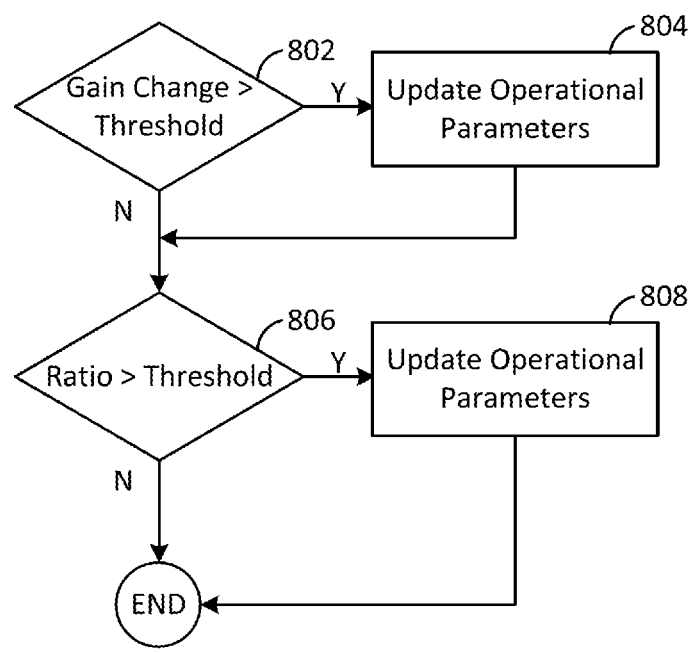
FIG. 8 depicts exemplary steps for frequency response compensation in accordance with some embodiments of the present disclosure.

FIGS. 6-8 depict exemplary steps for frequency response testing, failure detections, and compensation in accordance with some embodiments of the present disclosure. Although FIGS. 6-8 are described in the context of the present disclosure (e.g., the motion processing system 10, gyroscope 100, and gyroscopes having a frequency response as depicted in FIGS. 3-5), it will be understood that the methods and steps described in FIGS. 6-8 may be applied to any suitable gyroscope designs. Although a particular order and flow of steps is depicted in FIGS. 6-8, it will be understood that in some embodiments one or more of the steps may be modified, moved, removed, or added, and that the flow depicted in FIGS. 6-8 may be modified.

FIG. 6 depicts exemplary steps for frequency response testing in accordance with some embodiments of the present disclosure.

At step 602, test frequencies may be acquired for use in testing the frequency response as described herein. In an exemplary embodiment, a designed sense mode resonant frequency for a gyroscope may be at a frequency such as approximately 24 kHz. Although any suitable number of test frequencies may be provided, in an exemplary embodiment two test frequencies of 22 kHz and 21.5 kHz may be used. In some embodiments, the test frequencies and amplitudes may be modified, e.g., based on modifiable values in processing circuitry or register settings of a gyroscope chip. Processing may then continue to step 604.

At step 604, it may be determined whether a baseline response has been established for the sense oscillator. In some embodiments, a baseline response may be set at various times such as during final test during manufacturing, periodically during operation, each time the gyroscope receives power, or at other suitable times. This baseline may represent a gain that future testing results are measured against. If an appropriate baseline has not been established, processing may continue to step 606. If a baseline has been established, processing may continue to step 608.

At step 606, a baseline may be determined for the gyroscope at each of the test frequencies. The sense oscillator (e.g., any sense masses of the sense oscillator) may be driven at the test frequencies (e.g., 21.5 kHz and 22 kHz) with at test signal having a predetermined magnitude (or in some embodiments, a plurality of predetermined magnitudes). The gain may be measured (e.g., based on measurements by sense electrodes for the sense masses) and stored in memory (e.g., of a gyroscope chip or processing circuitry). Processing may then continue to step 608.

At step 608, the gyroscope may operate in its normal fashion, e.g., by providing a drive signal at a drive frequency (e.g., 27 kHz) to drive one or more masses of the gyroscope (e.g., a drive mass, Coriolis mass, and/or sense mass). When the gyroscope is rotated about an axis, the Coriolis force perpendicular to the drive direction and axis of rotation may be sensed at the drive frequency (e.g., by sense electrodes adjacent to (e.g., next to or inside a cavity of) a sense mass). Sense circuitry may process the signal to be provided to external circuitry and devices (e.g., processing circuitry of a motion processing system), and the results may be compared to thresholds, fused with other data, and otherwise utilized for various applications as described herein. Processing may then continue to step 610.

At steps 610-616, the test signals are applied to the sense oscillator (e.g., by drive combs of auxiliary actuators to drive a sense mass of the gyroscope) and measured (e.g., by one or more shared or dedicated sense electrodes). Although these steps are described as taking place in a sequential manner, it will be understood that the gyroscope may be driven at the test frequencies simultaneously or in any suitable sequence or order.

At step 610, the sense oscillator (e.g., sense masses of the gyroscope) may be driven at the first test frequency (e.g., 21.5 kHz) by auxiliary drive circuitry and auxiliary actuators (e.g., drive combs attached to the sense masses and anchors, respectively). This may cause components of the sense oscillator (e.g., the sense masses) to vibrate at the first test frequency, with the extent of the vibration varying based on the gain of the gyroscope. Processing may then continue to step 612.

At step 612, the response of the sense oscillator (e.g., sense masses of the gyroscope) may be measured at the first test frequency (e.g., 21.5 kHz) by sense electrodes (e.g., a sense electrode plate in plane and adjacent to the sense masses). The resulting signal may be provided to sense circuitry, which may process the signal and provide a magnitude value that is scaled in the same manner as the baseline signal for the first frequency. Processing may then continue to step 614.

At step 614, the sense oscillator (e.g., sense masses of the gyroscope) may be driven at the second test frequency (e.g., 22 kHz) by drive circuitry and auxiliary actuators (e.g., drive combs attached to the sense masses and anchors, respectively). This may cause components (e.g., the sense masses) to vibrate at the second test frequency, with the extent of the vibration varying based on the gain of the gyroscope. Processing may then continue to step 616.

At step 616, the response of the sense oscillator (e.g., sense masses of the gyroscope) may be measured at the second test frequency (e.g., 22 kHz) by sense electrodes (e.g., a sense electrode plate in plane and adjacent (e.g., next to or inside a cavity of) to the sense masses). The resulting signal may be provided to sense circuitry, which may process the signal and provide a magnitude value that is scaled in the same manner as the baseline signal for the first frequency. Processing may then continue to the steps of FIG. 7.

FIG. 7 depicts exemplary steps for frequency self-testing in accordance with some embodiments of the present disclosure. Although the self-test may be performed in any suitable manner, in an embodiment the results from the test frequencies may be compared to determine whether to perform a gain change or frequency shift test. Each test may have different thresholds that may be applied. Although the tests are depicted as being performed in a particular order in FIG. 7, it will be understood that the self-tests may be performed simultaneously or in any suitable order.

At step 702, the measured response to the driving of the sense oscillator at the first test frequency (e.g., 21.5 kHz) may be compared to the baseline for the first test frequency. In an embodiment, values such as a percentage change and absolute value of the magnitude of the difference between the measured and baseline results may be determined. Processing may continue to step 704.

At step 704, the measured response to the driving of the sense oscillator at the second test frequency (e.g., 22 Hz) may be compared to the baseline for the second test frequency. In an embodiment, values such as a percentage change and absolute value of the magnitude of the difference between the measured and baseline results may be determined. Processing may continue to step 706.

At step 706, a ratio between the changes at the first and second test frequencies may be determined. In an embodiment, the ratio may be based on a ratio of the percentage change for each test frequency or a ratio of the changes in the absolute values at each test frequency. Once the ratio has been calculated at step 706, processing may continue to step 708.

At step 708, the gain change at each of the test frequencies may be compared to one or more thresholds. In an embodiment, if the gain change for either test frequency exceeds a single threshold, the self-test may fail and processing may continue to step 710. In another embodiment, both gain changes must exceed a threshold for the self-test to fail. In yet another embodiment, both gain changes must exceed a first (e.g., lower) threshold and one of the gain changes must exceed a second (e.g., higher) threshold for the self-test to fail. Either or both of percentage and absolute value gain change may be used for any such embodiments, and other combinations of thresholds and value comparisons may be utilized in further embodiments. If the self-test failed at step 708, processing may continue to step 710. If the self-test did not fail at step 708, processing may continue to step 712.

At step 710, the gyroscope may have failed the gain change test. In some embodiments, the ratio between the gain change at the two test frequencies (e.g., as determined at step 706) may be analyzed to determine whether a frequency shift also occurred. In an embodiment, a higher ratio between the gain changes may indicate that a frequency shift has likely occurred. Accordingly, the ratio may be compared to a threshold to determine if a frequency shift also occurred. The results of the self-test may be reported (e.g., to processing circuitry or other device) and corrective action may be taken such as ceasing operation of a failed gyroscope. In an exemplary embodiment of a multi-axis gyroscope, axes that are still functioning normally may continue to operate, and in some embodiments, sensor fusion (e.g., from multiple gyroscopes and accelerometers) may be used in an attempt to estimate values for the missing axis. Processing of the steps of FIG. 7 may then end from step 710.

At step 712, the ratio between the gain changes at the test frequencies may be compared to one or more thresholds. In an embodiment, before comparing the ratio to the threshold, it must first be determined whether the gain change associated with one of the test frequencies exceeds a threshold (e.g., a frequency shift gain threshold). If neither gain change exceeds such a threshold, it is unlikely that there was any significant frequency shift. The ratio of the gain changes determined at step 706 may then be analyzed (e.g., compared to a threshold). As depicted in FIG. 5, a change in the sense mode resonant frequency of the gyroscope may be likely to result in a variation in the gain change experienced at the two test frequencies. By comparing the ratio to a threshold, it may be determined whether a frequency shift has exceeded a threshold beyond which it should be indicated that the gyroscope has failed. If the self-test failed at step 712, processing may continue to step 714. If the self-test did not fail at step 712, processing may continue to step 716.

At step 714 the gyroscope may have failed the frequency shift test. The results of the self-test may be reported (e.g., to processing circuitry or other device) and corrective action may be taken such as ceasing operation of a failed gyroscope. In an exemplary embodiment of a multi-axis gyroscope, axes that are still functioning normally may continue to operate, and in some embodiments, sensor fusion (e.g., from multiple gyroscopes and accelerometers) may be used in an attempt to estimate values for the missing axis. Processing of the steps of FIG. 7 may then end.

At step 716 the gyroscope may have passed both the gain change and frequency shift tests. The results of the self-tests may be reported (e.g., to processing circuitry or other device) and processing may continue to step 718.

At step 718, it may be determined whether the gyroscope is capable of performing compensation, e.g., to modify one or more operational parameters of the gyroscope to compensate for any changes in the gain or frequency that did not cause the gyroscope to fail the self-test. If compensation is to be performed, processing may continue to FIG. 8. If compensation is not to be performed, the processing of FIG. 7 may end.

FIG. 8 depicts exemplary steps for frequency response compensation in accordance with some embodiments of the present disclosure. Although particular tests and compensation techniques are described in FIG. 8, it will be understood that any suitable tests and techniques may be applied in accordance with the present disclosure and the skill of a person in the art. In an embodiment, values for a gain change and ratio for two test frequencies may already have been determined, e.g., at steps 702-706 of FIG. 7.

At step 802, the gain change at each of the test frequencies may be compared to one or more thresholds. In an embodiment, if the gain change for either test frequency exceeds a single threshold, compensation may be required and processing may continue to step 804. In another embodiment, both gain changes must exceed a threshold for compensation to be required. In another embodiment, both gain changes must exceed a first (e.g., lower) threshold and one of the gain changes must exceed a second (e.g., higher) threshold for the compensation to be required. In yet other embodiments, different thresholds and different threshold techniques may be applied to determine whether different compensation techniques should be used. Either or both of percentage and absolute value gain change may be used for any such embodiments, and other combinations of thresholds and value comparisons may be utilized in further embodiments. If compensation is required at step 802, processing may continue to step 804. If compensation is not required at step 802, processing may continue to step 806.

At step 804, compensation techniques may be applied to the gyroscope to compensate for the gain change experienced by the gyroscope. Exemplary embodiments of compensation techniques may include modifying the magnitude of the drive signal applied to the gyroscope (e.g., a drive voltage of drive combs that drive a drive mass of the gyroscope), modifying an operational parameter for the sense circuitry of the gyroscope (e.g., one or more amplifier gains of the sense circuitry), or modifying a scaling parameter associated with the sensed signal (e.g., a digital scaling factor associated with the sensed signal at the processing circuitry of the gyroscope or processing circuitry). In some embodiments, a plurality of these parameters may be modified. Once the operational parameters have been updated at step 804, processing may continue to step 806.

At step 806, the ratio between the gain changes at the test frequencies may be compared to one or more thresholds. In an embodiment, before comparing the ratio to the threshold, it must first be determined whether the gain change associated with one of the test frequencies exceeds a threshold (e.g., a frequency shift gain threshold). If neither gain change exceeds such a threshold, it is unlikely that there was any significant frequency shift. The ratio of the gain changes determined at step 706 may then be analyzed (e.g., compared to a threshold). In some embodiments, different thresholds and different threshold techniques may be applied to determine whether different compensation techniques should be used. If any ratio comparison thresholds are exceeded, processing may continue to step 808. If no ratio comparison thresholds are exceeded, the processing of FIG. 8 may end.

At step 808, compensation techniques may be applied to the gyroscope to compensate for the frequency shift experienced by the gyroscope, as indicated by the change in ratio. Exemplary embodiments of compensation techniques may include e modifying the magnitude of the drive signal applied to the gyroscope (e.g., a drive voltage of drive combs that drive a drive mass of the gyroscope), modifying an operational parameter for the sense circuitry of the gyroscope (e.g., one or more amplifier gains of the sense circuitry), or modifying a scaling parameter associated with the sensed signal (e.g., a digital scaling factor associated with the sensed signal at the processing circuitry of the gyroscope or processing circuitry). In some embodiments, a plurality of these parameters may be modified. Once the operational parameters have been updated at step 808, the processing of FIG. 8 may end.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method for testing a frequency response of a sense oscillator of a gyroscope, the method comprising:
    driving a drive oscillator of the gyroscope at a drive frequency;
    driving the sense oscillator at a first test frequency simultaneously with driving the drive oscillator, wherein the first test frequency is distinct from the drive frequency;
    driving the sense oscillator at a second test frequency simultaneously with driving the drive oscillator, wherein the second test frequency is distinct from the drive frequency and the first test frequency;
    measuring a first test response of the sense oscillator at the first test frequency;
    measuring a second test response of the sense oscillator at the second test frequency;
    determining a change in the frequency response of the sense oscillator based on the first test response and the second test response, wherein determining the change in the frequency response of the sense oscillator comprises determining a first gain change for the first test response, a second gain change for the second test response, and a ratio of the first gain change and the second gain change; and modifying one or more operational parameters of the gyroscope based on the change in the frequency response.

2. The method of claim 1, wherein both the first test frequency and the second test frequency are located on the same side of a sense mode resonant frequency.

3. The method of claim 2, wherein a difference between the first test frequency and the second test frequency is greater than 2 percent of the sense mode resonant frequency and less than 6 percent of the sense mode resonant frequency.

4. The method of claim 2, wherein the drive frequency is located on the other side of the sense mode resonant frequency from the first test frequency and the second test frequency.

5. The method of claim 2, wherein the drive frequency is located at least 6 percent away from the sense mode resonant frequency.

6. The method of claim 1, wherein the first test frequency and the second test frequency are both located at least 6 percent of a sense mode resonant frequency of the sense oscillator away from the sense mode resonant frequency.

7. The method of claim 1, wherein both a first test gain associated with the first test frequency and a second test gain associated with the second test frequency are within 75% of a sense gain at the drive frequency.

8. The method of claim 1, wherein one of a first test gain associated with the first test frequency or a second test gain associated with the second test frequency is within 25% of a sense gain at the drive frequency.

9. The method of claim 1, wherein the driving of the sense oscillator at the first test frequency and the driving of the sense oscillator at the second test frequency are both generated by sense electrodes of the gyroscope.

10. The method of claim 1, wherein determining the first gain change and the second gain change comprises:

determining the first gain change based on a difference between a magnitude of the first test response and a first baseline magnitude; and determining the second gain change based on a difference between a magnitude of the second test response and a second baseline magnitude.

11. The method of claim 1, wherein determining the change in the frequency response of the sense oscillator comprises determining that a shift in a sense mode resonant frequency of the sense oscillator has occurred when the first gain change exceeds a first threshold, the second gain change exceeds a second threshold, and the ratio exceeds a ratio threshold.

12. The method of claim 1, wherein determining the change in the frequency response of the sense oscillator comprises determining that a shift in a sense mode resonant frequency of the sense oscillator has occurred when the ratio exceeds a ratio threshold and at least one of the first gain change or the second gain change exceeds a gain threshold.

13. The method of claim 1, wherein determining the change in the frequency response of the sense oscillator comprises determining that a shift in the gain of the sense oscillator has occurred, based on the first gain change exceeding a first threshold, the second gain change exceeding a second threshold, and the ratio being less than a ratio threshold.

14. The method of claim 1, wherein modifying one or more operational parameters of the gyroscope based on the change in frequency response comprises adjusting the magnitude of the driving of the drive oscillator based on the change in frequency response.

15. The method of claim 1, wherein modifying one or more operational parameters of the gyroscope based on the change in frequency response comprises adjusting one or more scaling parameters based on the change in frequency response.

16. The method of claim 1, further comprising determining angular velocity based on a sense signal received at the drive frequency.

17. The method of claim 1, wherein a change in a gain of the sense oscillator at the drive frequency due to the driving of the sense oscillator at the first test frequency and the second test frequency is less than a threshold.

18. The method of claim 17, wherein the driving of the sense oscillator at the first test frequency is at a first magnitude, and the driving of the sense oscillator at the second test frequency is at a second magnitude.

19. A gyroscope, comprising:

a drive oscillator;

one or more drive electrodes to drive the drive oscillator at a drive frequency;

a sense oscillator, wherein the sense oscillator is driven at a first test frequency and a second test frequency, wherein the first test frequency is distinct from the drive frequency, wherein the second test frequency is distinct from the drive frequency and the first test frequency, and wherein the sense oscillator is driven at the first test frequency and second test frequency simultaneously with the driving of the drive oscillator at the drive frequency;

one or more sense electrodes to provide a first test response signal in response to an oscillation of the sense oscillator at the first test frequency and a second test response signal in response to an oscillation of the sense oscillator at the second test frequency;

processing circuitry configured to determine a change in the frequency response of the sense oscillator based on the first test response signal and the second test response signal, and to modify one or more operational parameters of the gyroscope based on the change in the frequency response, wherein the determination of the change in the frequency response of the sense oscillator comprises a determination of a first gain change for the first test response signal, a second gain change for the second test response signal, and a ratio of the first gain change and the second gain change.

20. The gyroscope of claim 19, wherein the determination of the first gain change is based on a difference between a magnitude of the first test response and a first baseline magnitude and the determination of the second gain change is based on a difference between a magnitude of the second test response and a second baseline magnitude.

21. The gyroscope of claim 19, wherein the determination of the change in the frequency response of the sense oscillator comprises a determination that a shift in a sense mode resonant frequency of the sense oscillator has occurred when the first gain change exceeds a first threshold, the second gain change exceeds a second threshold, and the ratio exceeds a ratio threshold.

22. The gyroscope of claim 19, wherein the determination of the change in the frequency response of the sense oscillator comprises a determination that a shift in a sense mode resonant frequency of the sense oscillator has occurred when the ratio exceeds a ratio threshold and at least one of the first gain change or the second gain change exceeds a gain threshold.

23. The gyroscope of claim 19, wherein the determination of the change in the frequency response of the sense oscillator comprises a determination that a shift in the gain of the sense oscillator has occurred, based on the first gain change exceeding a first threshold, the second gain change exceeding a second threshold, and the ratio being less than a ratio threshold.

24. The gyroscope of claim 19, wherein the modification of the one or more operational parameters of the gyroscope based on the change in frequency response comprises adjustment of the magnitude of the driving of the drive oscillator based on the change in frequency response.

25. The gyroscope of claim 19, wherein the modification of the one or more operational parameters of the gyroscope based on the change in frequency response comprises an adjustment of one or more scaling parameters based on the change in frequency response.

26. The gyroscope of claim 19, wherein the processing circuitry is further configured to determine angular velocity based on a sense signal received at the drive frequency.

27. The gyroscope of claim 19, wherein a change in a gain of the sense oscillator at the drive frequency due to the driving of the sense oscillator at the first test frequency and the second test frequency is less than a threshold.

28. The gyroscope of claim 27, wherein the drive of the sense oscillator at the first test frequency is at a first magnitude, and the drive of the sense oscillator at the second test frequency is at a second magnitude.

* * * * *